United States Patent [19]

Iwatsuki et al.

[11] Patent Number: 5,125,295
[45] Date of Patent: Jun. 30, 1992

[54] METHOD FOR SPEED STAGE SHIFTING OF AUTOMATIC TRANSMISSION WITH INCIPIENT BACK PRESSURE CONTROL

[75] Inventors: Kunihiro Iwatsuki; Hideaki Ootsubo; Tooru Matsubara, all of Toyota, Japan

[73] Assignee: Toyota Jidosha Kabushiki Kaisha, Toyota, Japan

[21] Appl. No.: 779,256

[22] Filed: Oct. 18, 1991

[30] Foreign Application Priority Data

Oct. 19, 1990 [JP] Japan .................. 2-280787

[51] Int. Cl.⁵ ........................... F16H 61/06
[52] U.S. Cl. ................................ 74/867
[58] Field of Search .......................... 74/867

[56] References Cited

U.S. PATENT DOCUMENTS

| | | | |
|---|---|---|---|
| 4,882,952 | 11/1989 | Kashihara et al. | 74/867 |
| 4,889,016 | 12/1989 | Kuwayama et al. | 74/867 X |
| 4,930,375 | 6/1990 | Yamamoto et al. | 74/866 |
| 4,942,787 | 7/1990 | Aoki et al. | 74/867 |
| 4,944,202 | 7/1990 | Gierer | 74/869 |
| 4,955,256 | 9/1990 | Kashihara et al. | 74/866 |

FOREIGN PATENT DOCUMENTS 60-231059 11/1985 Japan .
62-215157 9/1987 Japan .

*Primary Examiner*—Dirk Wright
*Attorney, Agent, or Firm*—Oblon, Spivak, McClelland, Maier & Neustadt

[57] ABSTRACT

In a speed stage shifting of an automatic transmission in a vehicle by engagement of a hydraulically operated friction engaging means through supply of a hydraulic fluid to the friction engaging means via a passage means including an accumulator operative with support by a back pressure, the back pressure is first maintained at an incipient pressure level, and is increased from the incipient pressure level toward a regular pressure level upon the lapse of a delay time from the detection of a transition phase when the transition phase starts before the lapse of a guard time or upon the lapse of the guard time when the guard time lapses before the start of the transition phase.

2 Claims, 5 Drawing Sheets of the automatic transmission for more smooth progress of the speed stage shifting by a certain further control of the pressure level of the hydraulic pressure supplied to the friction engaging means.
METHOD FOR SPEED STAGE SHIFTING OF AUTOMATIC TRANSMISSION WITH INCIPIENT BACK PRESSURE CONTROL

BACKGROUND OF THE INVENTION

1. Field of the Invention

The present invention relates to a method for speed stage shifting of an automatic transmission in a vehicle such as an automobile, and, more particularly, to a control of the back pressure of an accumulator connected to a passage supplying a hydraulic fluid to a hydraulically operated friction engaging means for shifting the automatic transmission from one speed stage to another speed stage.

2. Description of the Prior Art

In the speed stage shifting of an automatic transmission in a vehicle such as an automobile in which a second hydraulically operated friction engaging means is put into engagement in exchange with disengagement of a first hydraulically operated friction engaging means, in order to accomplish the speed stage shifting with minimum rate of change of the output torque of the transmission, it is essential that the torque load applied to the second friction engaging means is gradually increased so that the second friction engaging means is brought into full engagement through a certain transition period of sliding half engagement. In order to provide such a transitional sliding engagement an accumulator is generally connected to a passage supplying a hydraulic fluid to the friction engaging means. Such an accumulator maintains the hydraulic pressure supplied to the friction engaging means at an intermediate pressure level for a certain period as its piston member incorporated therein makes a stroke by absorbing a part of the hydraulic fluid supplied toward the friction engaging means. The piston of the accumulator is generally supported by a spring and a back pressure supplied to a rear side of the piston opposite to its front side exposed to the hydraulic pressure supplied toward the friction engaging means. It is known to control the transient intermediate pressure level of the hydraulic pressure supplied to the friction engaging means by the control of the back pressure of the accumulator in accordance with changes of the torque load imposed on the friction engaging means according to changes of the operating conditions of the transmission.

However, such a control of the back pressure of the accumulator in the conventional art is to change its pressure level according to the loading conditions of the transmission in such a long term base that includes the whole period of the speed stage shifting as a part thereof. In other words, the conventional control of the back pressure of the accumulator is such that the back pressure is modified according to the throttle opening of the engine so that the torque load imposed on the transmission is reflected upon the transient intermediate pressure level provided by the accumulator during the progress of the speed stage shifting.

However, it is noted that for a more improved smooth speed stage shifting of the transmission it is essential that the progress of engagement at the very moment of transfer of the friction engaging means from its disengaged state into its slidingly half engages state is still further reduced to more gradual manner.

SUMMARY OF THE INVENTION

It is therefore the object of the present invention to improve the speed stage shifting of the automatic transmission for more smooth progress of the speed stage shifting by a certain further control of the pressure level of the hydraulic pressure supplied to the friction engaging means.

According to the present invention the above-mentioned object is accomplished by a method for speed stage shifting of an automatic transmission in a vehicle, including a process of engaging a hydraulically operated friction engaging means by supply of a hydraulic fluid to the friction engaging means through a passage means including an accumulator operative with support by a back pressure, comprising the steps of:

maintaining the back pressure at an incipient pressure level at least after a decision on carrying out the speed stage shifting, detecting either the start of a transition phase or the lapse of a guard time whichever occurs earlier after the decision on carrying out the speed stage shifting, and increasing the back pressure from the incipient pressure level toward a regular pressure level upon the lapse of a delay time from the detection of the transition phase when the transition phase starts before the lapse of the guard time or upon the lapse of the guard time when the guard time lapses before the start of the transition phase.

When the accumulator back pressure is maintained at an incipient pressure level lower than the regular pressure level at the moment at which the friction engaging means first contacts, the most delicate instant in the start of engagement of the friction engaging means is passed under a further lower friction force acting between the mutually engaging friction elements. Further, as the accumulator back pressure is increased thereafter toward its regular pressure level upon the detection of the start of the transition phase with an appropriate delay time, the transition from the open state to the fully engaged state of the friction engaging means is accomplished at high steadiness with monotonously gradual recovery of torque transmittance.

Further, since such a back-up program is prepared that the recovery of torque transmittance is ensured with no undue delay if the transition phase does not start in a predetermined period set up by the guard time, any temporally imposed torque overload condition is met with, causing no undesirably long void of connection in the speed stage shifting of the automatic transmission.

In the above-mentioned method for speed stage shifting, when the incipient pressure level is increased upon the detection of the lapse of the guard time, the regular pressure level of the accumulator back pressure may be modified for an increase based upon the pressure level of the accumulator back pressure at a moment at which the transition phase starts in the process of increasing the accumulator back pressure as started after the lapse of the guard time.

BRIEF DESCRIPTION OF THE DRAWING

In the accompanying drawings.

DESCRIPTION OF THE PREFERRED EMBODIMENT

In the following the present invention will be described with respect to a preferred embodiment thereof with reference to the accompanying drawings.

Figure 1:
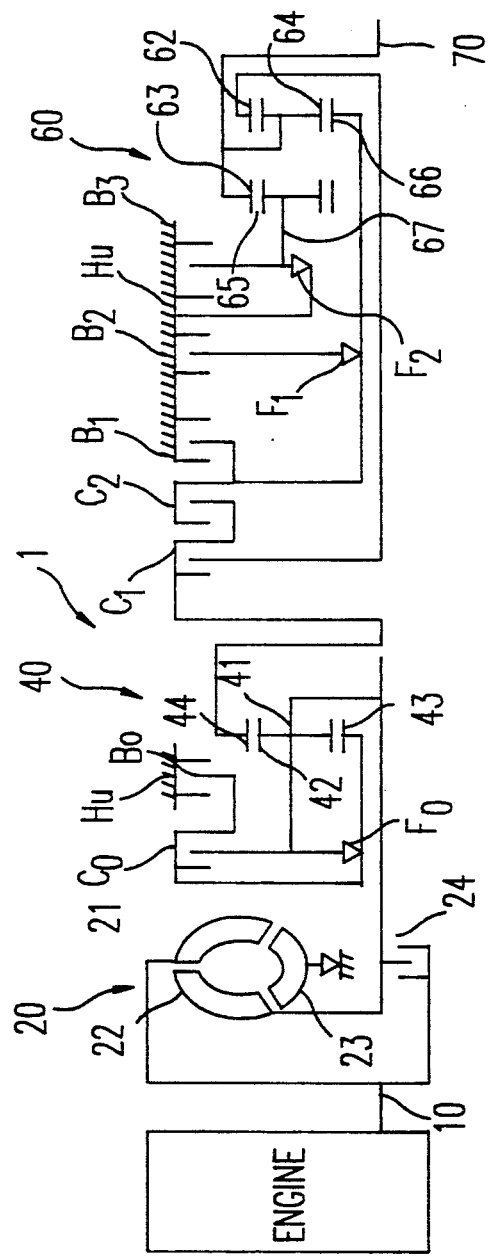
FIG. 1 is a diagrammatical illustration of an example of the power system of the automobile by which the method for speed stage shifting according to the present invention may be carried out.

Referring to FIG. 1 illustrating diagrammatically an automatic transmission in a vehicle to which the transmission control method according to the present invention may be applied, the transmission generally designated by reference numeral 1 comprises a torque converter 20 of a conventional type having a pump 21 connected with an engine via an input shaft 10, a turbine 22 and a stator 23, a lock-up clutch 24 for selectively directly connecting the pump 21 with the turbine 22, a first gear unit 40 including a planetary gear mechanism having a sun gear 43, a ring gear 44, a planetary pinion 42 and a carrier 41 connected with the turbine 22 of the torque converter 20, a clutch $C_0$ for selectively connecting the sun gear 43 with the carrier 41, a brake $B_0$ for selectively braking the sun gear 43 relative to a housing Hu and a one way clutch $F_0$ for torque transmittingly connecting the sun gear 43 with the carrier 41 only in one rotational direction, and a second gear unit 60 including a first planetary gear mechanism having a sun gear 61, a ring gear 62, a planetary pinion 64 and a carrier 66, a second planetary gear mechanism having a sun gear 61 common with the sun gear 61 of the first planetary gear mechanism, a ring gear 63, a planetary pinion 65 an a carrier 67, a clutch $C_1$ for selectively connecting the ring gear 62 with the ring gear 44 of the first gear unit 40, a clutch $C_2$ for selectively connecting the sun gears 61 with the ring gear 44 of the first gear unit 40, a brake $B_1$ for selectively braking the sun gears 61 relative to the housing Hu, a series combination of a brake $B_2$ and a one way clutch $F_1$ for selectively braking the sun gears 61 only in one rotational direction when the brake $B_2$ is engaged, a brake $B_3$ for selectively braking the carrier 67 relative to the housing Hu, and a one way clutch $F_2$ for braking the carrier 67 relative to the housing Hu only in one rotational direction, wherein the carrier 66 and the ring gear 63 are connected with one another to serve as an output shaft of the transmission.

Figure 2:
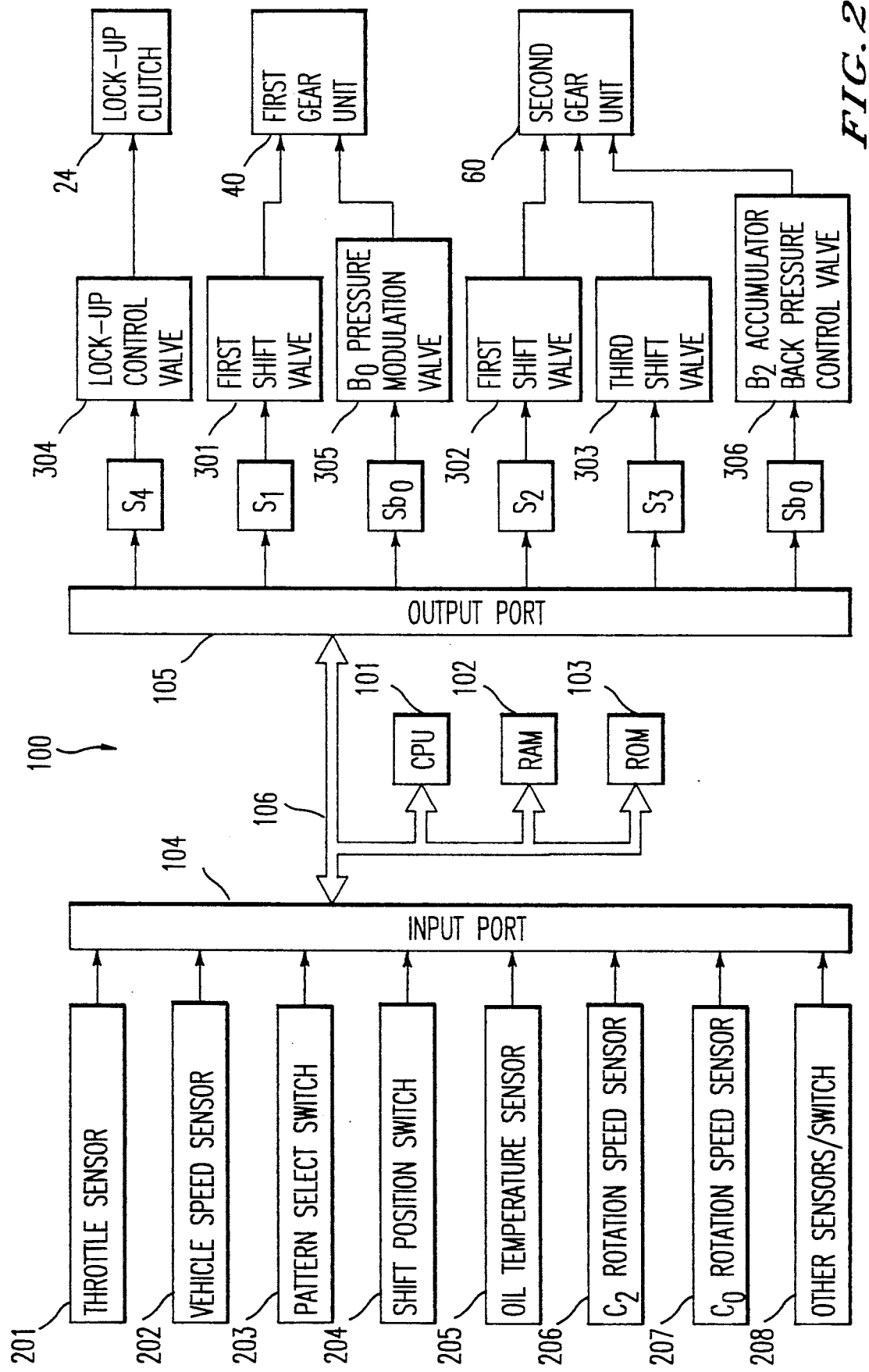
FIG. 2 is a diagrammatical illustration of the control system for operating the power system shown in FIG. 1.

The clutches $C_0$, $C_1$ and $C_2$ and the brakes $B_0$, $B_1$, $B_2$ and $B_3$ are hydraulically operated to be engaged or disengage by a electro-hydraulic control system the general concept of which is well known in the art in such a manner that solenoid-operated change-over valves change over supply and exhaust of hydraulic pressure to and from the respective clutches and brakes under the control of an electronic control unit. FIG. 2 shows such an electro-hydraulic control system in a diagrammatical illustration.

The tandem connection of the first gear unit 40 and the second gear unit 60 is controlled according to the conventional method to provide four forward speed stages by the second gear unit 60 being changed over between three different gear ratios while the first gear unit 40 is maintained in its lower gear stage so that the 1st, 2nd and 3rd speed stages are provided, and then by the first gear unit 40 being changed over to its higher gear stage while the second gear unit 60 is maintained at the 3rd speed stage so that the 4th speed stage is provided as an overdrive stage, by an electro-hydraulic control unit shown in FIG. 2, according to on and off combinations of the clutches $C_0$–$C_2$, the brakes $B_0$–$B_3$ and the one way clutches $F_1$–$F_2$ as shown in Table 1:

TABLE 1

| Range | Speed | C0 | B0 | C1 | C2 | B1 | B2 | B3 | F0 | F1 | F2 |
|---|---|---|---|---|---|---|---|---|---|---|---|
| R | — | o |  |  | o |  | o |  |  |  |  |
| D | 1st | o |  | o |  |  |  |  | o |  | o |
| D | 2nd | o |  | o |  |  | o |  | o | o |  |
| D | 3rd | o |  | o | o |  | o |  | o |  |  |
| D | 4th |  | o | o | o |  | o |  |  |  |  |
| 2 | 1st | o |  | o |  |  |  |  | o |  | o |
| 2 | 2nd | o |  | o |  | o | o |  | o | o |  |
| L | 1st | o |  | o |  |  |  | o | o |  | o |

In the above table, "o" indicates that the clutch, brake or one way clutch is engaged at the corresponding speed stage under the corresponding shift range.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components The electronic control unit 100 is supplied with various data through the input port means 104 such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as the R, N, D, 2 and L set by a manual lever from a shift position switch 204, oil temperature from an oil temperature sensor 205, rotational speed of an outer drum of the clutch $C_0$ from a $C_0$ rotation speed sensor 206, rotational speed of an outer drum of the clutch $C_2$ from a $C_2$ rotation speed sensor 207 and other data from other sensors and/or switches or the like generally designated by 208.

In the electronic control unit 100, the CPU 101 conducts certain calculations including the decisions on various speed stage shiftings based upon the data received from said sensors and/or switches and the programs stored in the ROM 103 in cooperation of the RAM 102, and outputs control signals to a hydraulic control means including various standard components not shown in the figure and particularly the following components:

$S_1$ is a solenoid valve which controls according to on and off thereof changing-over of a first shift valve 301 which controls supply and exhaust of hydraulic pressure to and from the clutch $C_0$ and the Brake $B_0$ of the first gear unit 40.

$S_2$ and $S_3$ are solenoid valves which control according to on and off thereof changing-over of a second shift valve 302 and a third shift valve 303 which control supply and exhaust of hydraulic pressure to and from the clutches $C_1$ and $C_2$ and the brakes $B_1$, $B_2$ and $B_3$ of the second gear unit 60. An example of more detailed constructions of the combination of the solenoid valves $S_2$ and $S_3$ and the shift valves 302 and 303 is shown in U.S. Pat. No. 5,029,493 assigned to the same assignee as the present application, in which the shift valve 302 is changed over between a first shift position for providing the 1st speed stage and a second shift position for providing the 2nd, 3rd and 4th speed stages according to on and off of the solenoid valve $S_2$, while the shift valve 303 is changed over between a first shift position for proving the 1st and 2nd speed stages and a second shift position for providing the 3rd and 4th speed stages according to on and off of the solenoid valve $S_3$. Such a construction with respect to the combination of the solenoid valves $S_2$ and $S_3$ and the shift valves 302 and 303 is herein incorporated by the reference to the above-mentioned U.S. patent.

$S_4$ is a solenoid valve which controls according to on and off thereof change-over of a lock-up control valve 304 which controls supply and exhaust of hydraulic pressure to and from the lock-up clutch 24.

$Sb_0$ is a solenoid valve which controls according to periodical on and off thereof an opening of a $B_0$ pressure modulation valve 305 which controls hydraulic pressure in the brake $B_0$ so that the pressure in the brake $B_0$ is continually changed according to the duty ratio of the on and off of the solenoid valve $Sb_0$.

$Sb_2$ is a solenoid valve which controls according to periodical on and off thereof an opening of a $B_2$ accumulator back pressure control valve 306 which controls a back pressure in an accumulator for the brake $B_2$ so that the progress of engagement or disengagement of the brake $B_2$ is continually controlled according to the duty ratio of the on and off of the solenoid valve $Sb_2$.

Figure 3:
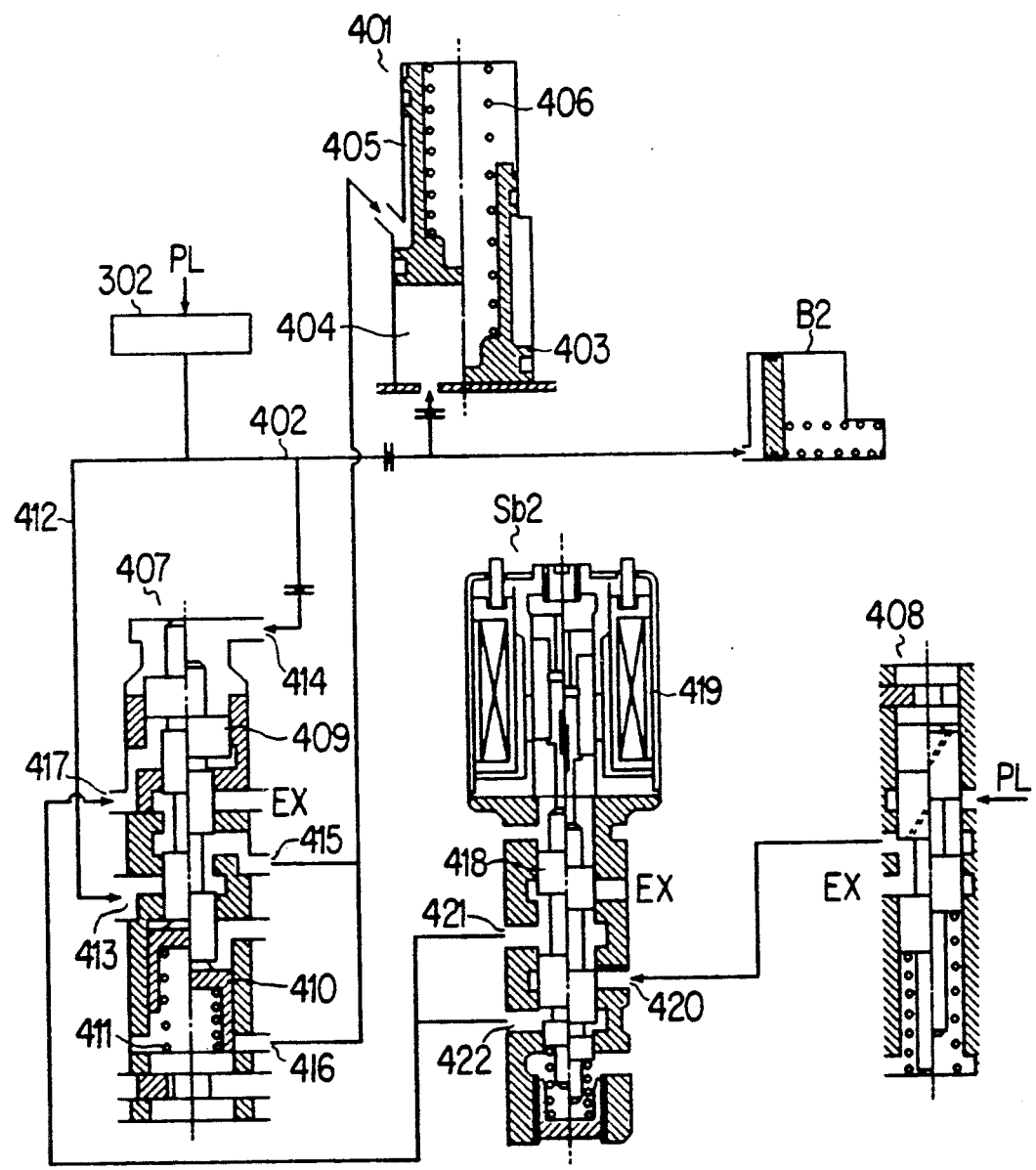
FIG. 3 is a partial illustration of the hydraulic circuit incorporated in the control system shown in FIG. 2 with respect to those devices more directly concerned with the method for speed stage shifting according to the present invention.

In the following the method for speed stage shifting according to the present invention will be described, as an embodiment thereof, with respect to shifting the transmission shown in FIG. 1 from the 1st speed stage to the 2nd speed stage. In order to accomplish this speed stage shifting the brake $B_2$ is newly engaged. As shown in FIGS. 2 and 3, the supply and exhaust of a hydraulic pressure, generally the so-called line pressure PL, to and from the brake $B_2$ is controlled by the second shift valve 302 a detailed construction of which is shown in the above-mentioned U.S. Pat. No. 5,029,493.

An accumulator 401 is connected to a passage 402 extending from the second shift valve 302 to the brake $B_2$ for supplying and exhausting the hydraulic fluid to and from the brake $B_2$. The accumulator 401 has a stepped piston 403 received in a correspondingly stepped bore formed in the housing of the hydraulic control device so as to define an accumulator chamber 404 connected to the passage 402 and a back pressure chamber 405. The piston 403 is biased by a compression coil spring 406 in the direction of decreasing the volume of the accumulator chamber 404. The hydraulic pressure supplied to the back pressure chamber 405, i.e. the accumulator back pressure, is controlled by an accumulator back pressure control valve 407, a solenoid valve $Sb_2$ and a modulator valve 408.

The accumulator back pressure control valve 407 has a spool element 409 and a piston element 410 received in the respectively corresponding bores formed in the housing of the hydraulic control device. The piston element 410 is biased upward in the figure by a compression coil spring 411. The hydraulic pressure supplied toward the brake $B_2$ is branched by a passage 412 to be supplied to a port 413 of the accumulator back pressure control valve 407. The hydraulic pressure in the passage 402 is also supplied to a control port 414 of the control valve 407. The hydraulic pressure to be supplied to the back pressure chamber 405 of the accumulator 401 as the back pressure is delivered at a port 415 of the control valve 407. This hydraulic pressure is supplied to a feedback port 416 of the control valve 407. A control pressure regulated by the solenoid valve $Sb_2$ is supplied to a control port 417 of the control valve 407.

The solenoid valve $Sb_2$ has a spool element 418 received in a corresponding bore formed in the housing of the hydraulic control device and a solenoid actuator 419 which operates the spool element 418 according to an electric current signal supplied thereto. The electric current signal supplied to the solenoid 419 is a duty ratio signal which determines the ratio of communication between an input port 420 and two output ports 421 and 422 which are alternatively connected to exhaust ports EX, so that the hydraulic pressure supplied to the control port 417 of the accumulator back pressure control valve 407 is controlled to a pressure level corresponding to the duty ratio of the electric current signal supplied to the solenoid actuator 419. The hydraulic pressure source supplied to the input port 420 is modified to an appropriately reduced pressure level from the line pressure PL by the modulator valve 408 which is of a well known type in this art.

As will be understood from the construction shown in FIG. 3, the back pressure in the back pressure chamber 405 of the accumulator 401 is controlled to change optionally or remain stably according to the duty ratio of the electric current signal supplied to the solenoid actuator 419 of the solenoid valve $Sb_2$.

Figure 4:
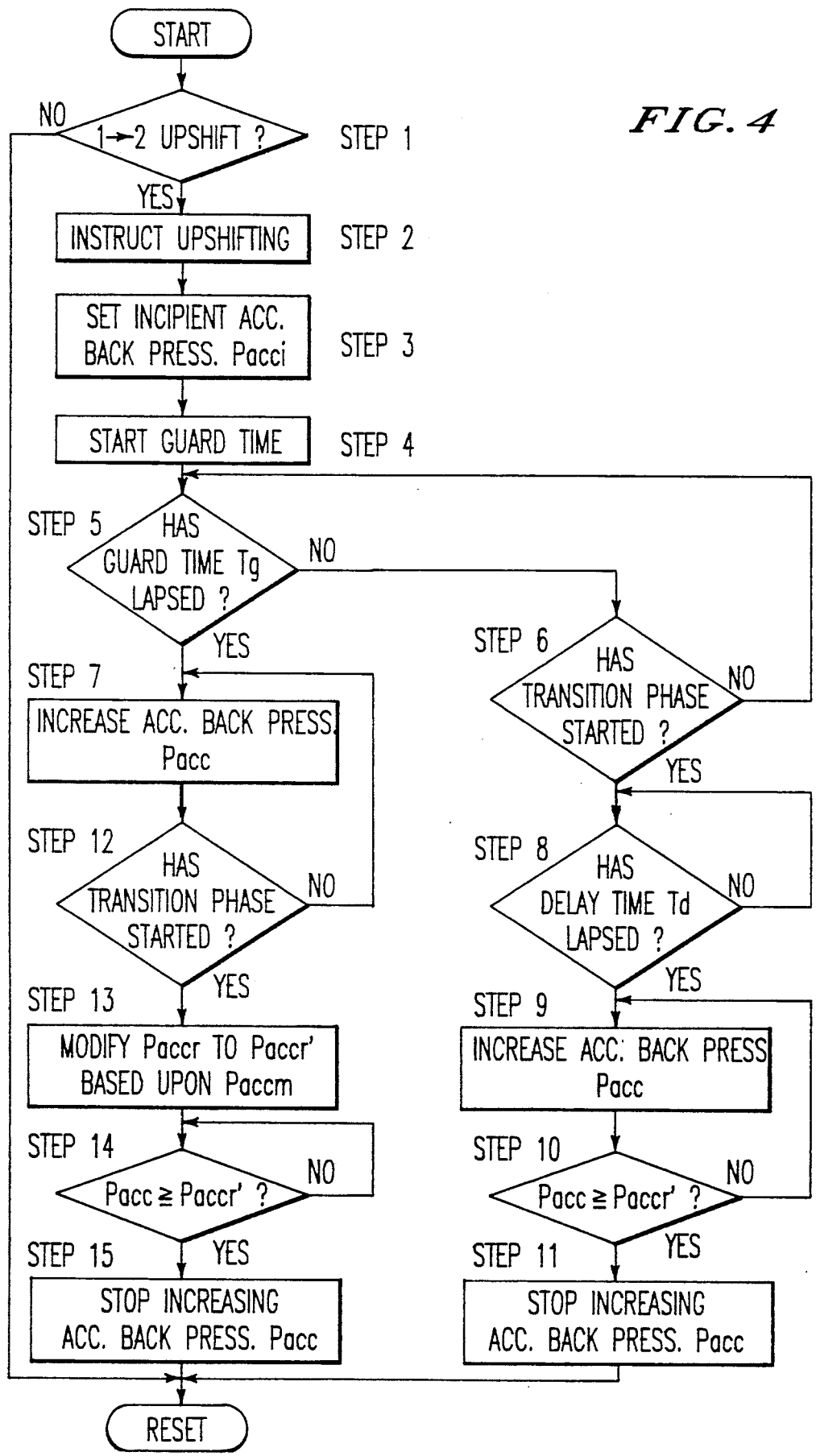
FIG. 4 is a flowchart showing an embodiment of the method for speed stage shifting according to the present invention in the form of flow of processes.

The processes carried out for shifting the transmission shown in FIG. 1 from the 1st speed stage to the 2nd speed stage will be described with further reference to FIGS. 4 and 5.

When the control has started, in step 1, it is judged by the CPU 101, based upon the data repetitively read in from the sensors and the switches as shown in FIG. 2, whether the 1-2 upshift is required or not. If the answer is yes, or if the CPU decides on carrying out the 1-2 upshift, the control process proceeds to step 2. If the answer is no, the control program is reset for next operation.

In step 2, the 1-2 upshift is instructed. This is done at the time point t1 in FIG. 5. According to this instruction, the solenoid $S_2$ is operated, and the second shift valve 302 is changed over so as to start the supply of hydraulic pressure toward the brake $B_2$.

Then, in step 3, the accumulator back pressure is set to an incipient pressure level Pacci which is lower than the conventionally regular pressure level set up in the corresponding accumulators. Any desired data available from the sensors and switches shown in FIG. 2 may be used in determining the incipient pressure level Pacci. Further, in step 4, a guard timer is started. Although the processes in steps 2, 3 and 4 are shown to be carried out in succession in FIG. 4, these processes may of course be carried out substantially at the same time.

Subsequent to step 4, in step 5, it is judged if a guard time Tg set up in the guard timer in step 4 has lapsed. If the answer is no, the control process proceeds to step 6, whereas if the answer is yes, the control process proceeds to step 7.

In step 6, it is judged if the transition phase has started. In the present 1-2 upshift of the transmission shown in FIG. 1 in which the brake B$_2$ is put into engagement, the start of the transition phase may be detected by a deceleration of the input rotation speed of the transmission due to a braking action applied from the vehicle driving wheels to the engine. As shown in FIG. 5, when the transition phase starts at time point t2, it is, as a matter of practice, confirmed with an unavoidable delay of time at a time point such as t3. When the answer in the judgement in step 6 is no, the control process returns before step 5, whereas if the answer is yes, the control process proceeds to step 8.

Figure 5:
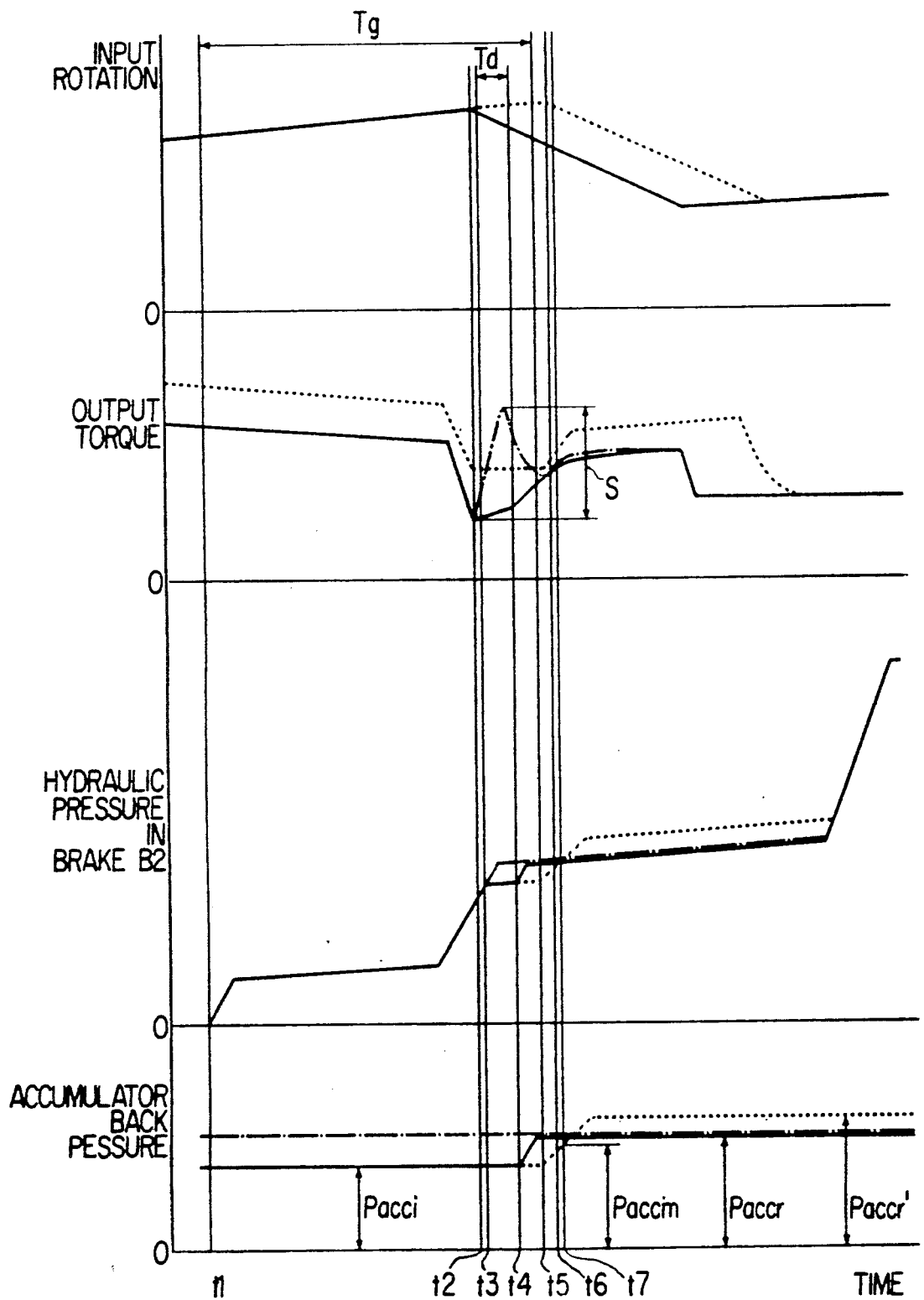
FIG. 5 is a composite diagram showing the performances of a speed stage shifting carried out according to the method of the present invention.

In step 8, it is judged if a delay time Td of such certain magnitude as shown in FIG. 5 has lapsed or not. If the answer is no, the control process returns before step 8 so as to wait the lapse of the delay time Td. This delay time Td provides a smooth and gradual recovery of torque transmittance as shown by the solid line in FIG. 5. When the answer of the judgement in step 8 turns into yes, at a time point such as t4 in FIG. 5, the control process proceeds to step 9.

In step 9, the accumulator back pressure is increased from its incipient pressure level Pacci toward its regular pressure level Paccr. It is judged in step 10 if the accumulator back pressure has increased to the regular pressure level Paccr. Until the regular pressure level Paccr is attained, the control process returns before step 9, and when the answer has turned into yes, the control process proceeds to step 11.

In step 11, the increase of the accumulator back pressure Pacc is stopped, and the control program is finished.

On the other hand, when the control process has proceeded to step 7 by the lapse of the guard time Tg at a time point such t5 in FIG. 5 before it is judged in step 6 that the transition phase has started, because of a hight torque load imposed on the transmission as shown by the broken line in FIG. 5, in step 7, the accumulator back pressure Pacc is immediately increased toward its regular pressure level. Then, in step 12, it is judged if the transition phase has started. If the answer is no, the control process returns before step 7 and the increase of the accumulator back pressure Pacc is continued. As the accumulator back pressure is being increased, in any event the transition phase will soon start at a time point such as t6, and will be detected at a time point such as t7 after an unavoidable delay, so that the answer to the judgement in step 12 will turn into yes. Then, the control process proceeds to step 13.

In step 13, the regular pressure level Paccr of the accumulator back pressure is modified for an increase based upon the pressure level Paccm of the accumulator back pressure at the time point t7 at which the transition phase started so that the pressure level Paccr is temporally increased to Paccr' as shown by a broken line in FIG. 5. The fact that the transition phase did not start in a relatively long period such as set up by the guard time Tg implies that a higher torque load is imposed on the power system than usual, as shown by the broken line with respect to the output torque in FIG. 5. The temporal modification for an increase of the regular pressure level Paccr of the accumulator back pressure in step 13 meets with such a temporal high torque load condition.

Subsequent to step 13, in step 14, it is judged if the accumulator back pressure Pacc has reached the regular pressure level Paccr' which has been temporally increased in step 13. Until it is judged that the accumulator back pressure Pacc has reached the modified regular pressure level Paccr', the increase of the back pressure is continued. When the answer to the judgement in step 14 has turned into yes, the control process proceeds to step 15, and the increase of the accumulator back pressure is stopped, and the control program is finished.

According to such control processes as carried out in steps 7 and 12-15, the input rotation speed, the output torque, the hydraulic pressure in the brake B$_2$ and the accumulator back pressure Pacc change as shown by the corresponding broken lines in FIG. 5, in contrast to the corresponding performances shown by the solid lines for the control processes carried out in steps 6-11.

In FIG. 5, the dot-dash lines with respect to the output torque, the hydraulic pressure in the brake B$_2$ and the accumulator back pressure show the respective performances according to the conventional art in which the accumulator back pressure is maintained at a constant level throughout the period of speed stage shifting, although the magnitude of the pressure level may be changed as a whole according to the load condition of the transmission as is increased in accordance with increase of the throttle opening of the engine. However, when the accumulator back pressure is maintained at a constant pressure level throughout the period of speed stage shifting, a peaky change such as S is apt to occur in the output torque at the moment at which the friction engaging means first contacts. Such a peaky change in the output torque is avoided by the present invention.

Although the invention has been described in detail with respect to a preferred embodiment thereof, it will be apparent for those skilled in the art that various modifications are possible with respect to the shown and described embodiment without departing from the spirit of the present invention.

We claim:

1. A method for speed stage shifting of an automatic transmission in a vehicle, including a process of engaging a hydraulically operated friction engaging means by supply of a hydraulic fluid to the friction engaging means through a passage means including an accumulator operative with support by a back pressure, comprising the steps of:

maintaining the back pressure at an incipient pressure level at least after a decision on carrying out the speed stage shifting, detecting either the start of a transition phase or the lapse of a guard time whichever occurs earlier after the decision on carrying out the speed stage shifting, and increasing the back pressure from the incipient pressure level toward a regular pressure level upon the lapse of a delay time from the detection of the transition phase when the transition phase starts before the lapse of the guard time or upon the lapse of the guard time when the guard time lapses before the start of the transition phase.

2. A method for speed stage shifting according to claim 1, wherein the regular pressure level of the accumulator back pressure is modified for an increase based upon the pressure level of the accumulator back pressure at a moment at which the transition phase starts in the process of increasing the accumulator back pressure as started after the lapse of the guard time.

* * * * *